Patented Jan. 16, 1940

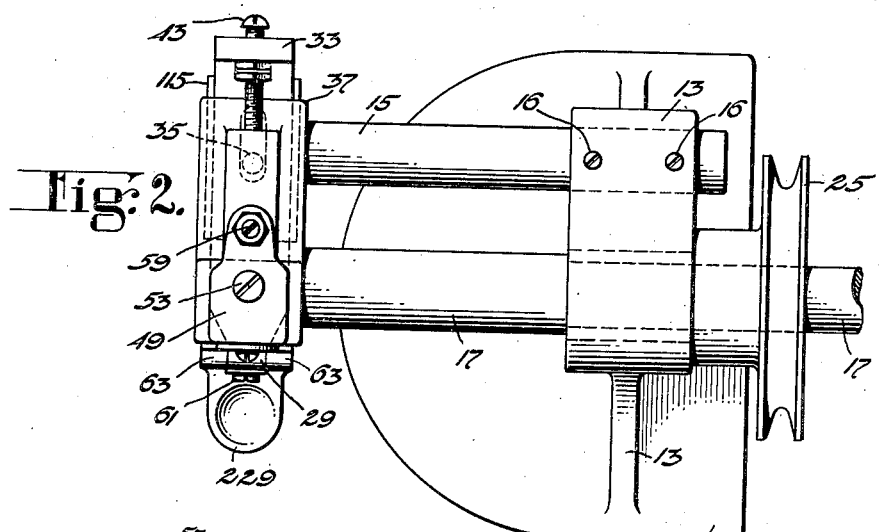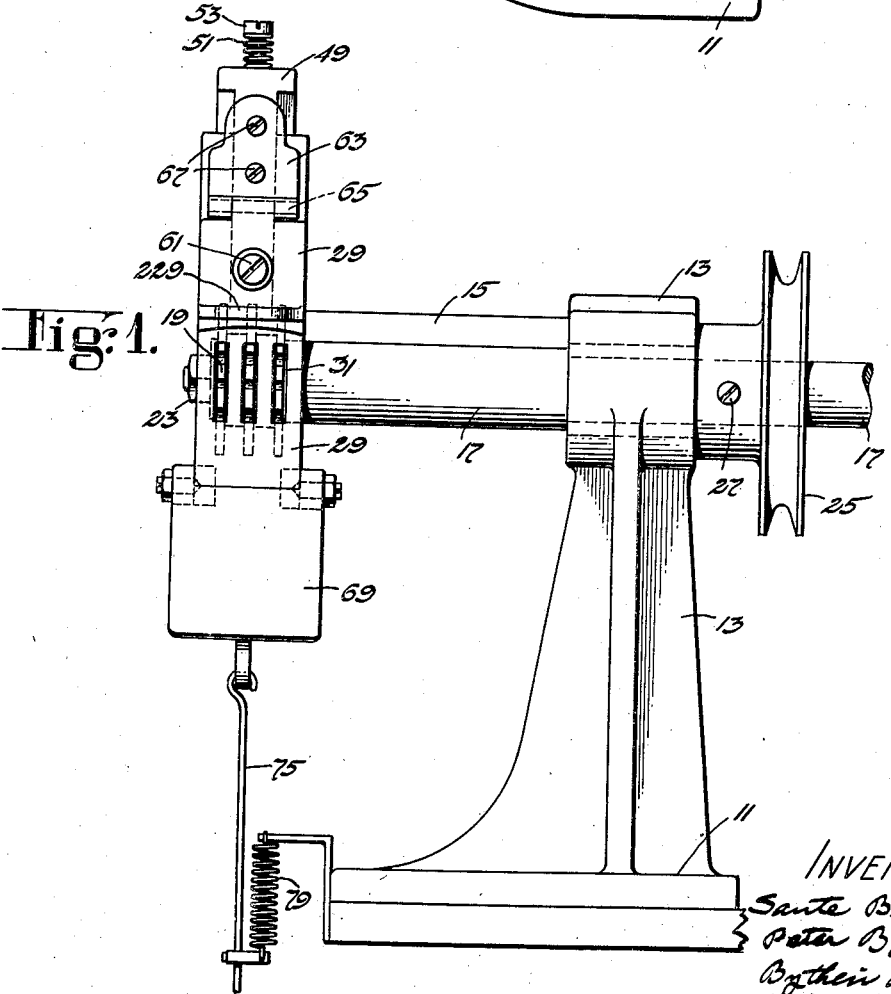

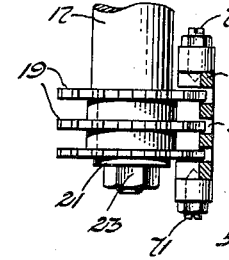

2,187,142

UNITED STATES PATENT OFFICE 2,187,142

GROOVING MACHINE

Sante Baroni and Peter Baroni, Philadelphia, Pa., assignors to United Shoe Machinery Corporation, Borough of Flemington, N. J., a corporation of New Jersey Application April 29, 1938, Serial No. 205,044

14 Claims. (Cl. 12—51)

This invention relates to grooving and similar machines and is herein illustrated as embodied in a machine for cutting grooves in the marginal portion of the bottom of a lasted shoe.

In United States Letters Patent No. 2,073,725, granted March 16, 1937, upon an application filed in our names, there is disclosed a method of increasing the flexibility of the bottom of a shoe by cutting transverse grooves through marginal portions of the overlasted upper materials of the shoe, these grooves extending through the hard lasting cement by which the overlasted upper materials are attached to the insole as well as through the coat of hard sole-attaching cement on the exposed face of the overlasted upper which will later be activated prior to the attaching of the outsole. The present invention provides a machine by which this and similar operations may be performed.

To this end, in accordance with one feature of the invention, there is provided a rotary cutter-head comprising spaced cutters, and a work rest comprising a plate having slots in register with the cutters, said plate being arranged normally to mask the cutters but being movable by pressure of the work against it to cause limited segments of the cutters to project through the slots and thus cut grooves in the work. In the illustrated machine this slotted plate is movable toward the axis of rotation of the cutter-head in opposition to a spring, and a stop is arranged to arrest such movement to limit the depth of the grooves generated by the cutters.

According to another feature of the invention, the slotted plate is also movable in a path parallel to a tangent of the cutter-head, the purpose of this movement being to elongate the grooves generated by the cutters without affecting their depth. In the illustrated construction an individual stop is arranged to arrest this movement, and a spring is arranged to produce movement in the opposite direction to an initial position. Moreover, to insure the desired location of the grooves in the work the slotted plate is provided with an abutment against which one side of the work may be placed before the cutters penetrate the latter. This abutment may be used also to effect the secondary movement of the slotted plate by which the grooves are elongated.

These and other features of the invention including certain details of construction and combinations of parts will be described as embodied in an illustrated machine and pointed out in the appended claims.

Referring to the accompanying drawings,

Fig. 1 is a front elevation of a machine in which the present invention is embodied;

Fig. 2 is a plan of the machine;

Fig. 3 is an end elevation of the machine, a shoe being shown in process of being operated upon;

Fig. 4 is a section on the line IV—IV of Fig. 6 through the slotted plate, the cutter-head and shaft being shown in plan;

Fig. 5 is a section on the line V—V of Fig. 6;

Fig. 6 is a vertical section through the slotted plate and its mounting, the cutter-head being shown in end elevation; and Fig. 7 is a perspective of a shoe which has been operated upon.

Before describing the machine in detail, a brief description of its construction and mode of operation will be given. The purpose of the machine is to cut grooves, such as those indicated at 100 in Fig. 7, in the bottom of a lasted shoe 200, said grooves being located as shown with their outer ends spaced from the adjacent edges of the bottom of the shoe and being preferably deep enough to extend through the overlasted upper materials 300 into the insole 400. For cutting these grooves in the localities shown, the machine comprises a rotary cutter-head having spaced toothed cutters 19 and a slotted plate 29 which is normally held (Fig. 6) in front of the cutter-head with its slots 31 in register with the cutters but in such position that the cutters do not project through the slots, said plate being mounted for horizontal movement toward and from the cutter-head and for vertical movement. In order to cut one of the series of grooves 100, the shoe is presented to the machine as shown in Fig. 3 with a locality on the margin of the bottom of the shoe resting against the slotted plate and a side portion of the shoe in contact with an abutment 129. The shoe is pressed against the plate 29 to cause the cutters to extend through the slots and cut grooves in the margin of the bottom of the shoe (this being the position shown in Fig. 3); and then the shoe, and with it the plate 29 and abutment 129, are lifted to move the shoe in a path substantially parallel to a tangent to the cutter-head, the depths and lengths of the grooves being determined by stops which limit the movements of the plate and the abutment. The shoe is then removed, reversed end for end, and grooves are cut in the opposite margin of the bottom.

Referring to Figs. 1 and 2, the machine comprises a base 11 integral with which is an upright standard 13 having formed in its upper portion a bore, to receive and hold stationary a rod 15, and a bearing to receive a rotary shaft 17 having mounted upon its left-hand end, which is of reduced diameter, a cutter-head comprising the spaced cutters 19 held fast to the shaft by a washer 21 and a nut 23. The rod 15 is held fast in the bore in the standard by screws 16, and the shaft 17 is held from longitudinal movement by the hub of a pulley 25 which engages one end of the bearing and a shoulder on the shaft which engages the other end. The shaft 17 is rotated at high speed by a belt, not shown, which runs on the pulley 25, said pulley being fastened to the end of the shaft by a set screw 27.

Located in front of the cutter-head is the plate 29 having the elongated vertical slots 31 which are in register with the spaced cutters 19, the members by which the plate is supported being carried at the outer end of the rod 15. Referring now more particularly to Figs. 3 to 6, integral with the outer end of rod 15 is a support 115 in the top of which is a channel extending at right angles to the axis of rotation of the cutter-head; and mounted for sliding adjustment in this channel is a guide 33, said guide being held in adjusted position by a cap screw 35 the stem of which passes through a slot in the support 115 and is threaded into the under side of the guide. Slidably mounted on the guide 33 is a block 37 which is urged continually forward by a spring-pressed plunger 39 the rear end of which engages the end of a screw 41 threaded through an upright projection of the guide 33. The extent of forward-and-back movement of the block is limited by a screw 43 the stem of which passes loosely through a bore in the upstanding projection and is threaded into the block, said screw having threaded on it a nut 45 and a check nut 47 with a washer between the two. The spring-pressed plunger 39 normally holds the block 37 in the position shown in Fig. 6 but the block may be pushed back when a shoe is presented to the cutter-head, as shown in Fig. 3, until the nut 45 contacts with the upstanding projection on the guide 33. By turning the screw 43 the block 37 may be adjusted forward and back, and by changing the position of the nut 45 on the screw 43 the extent to which the block may be pushed back may be varied. The slotted plate 29 is carried by the block 37 in a manner presently to be explained; and the purpose of the various adjustments of the block is to cause the slotted plate to be held in the desired position in front of the cutter-head (for example the position shown in Fig. 6) and to limit the extent to which the plate may be pushed toward the cutter-head so as to determine the depths of the grooves which are cut in the bottom of the shoe. As has been explained above, the proper presentation of the shoe against the slotted plate 29 is facilitated by the provision of the abutment 129 which engages the side of the shoe.

Inasmuch as the grooves cut in the bottom of the shoe by presenting the bottom to the cutter-head may not be of the desired length, provision is made for permitting the shoe, and with it the abutment, to be moved up in a path which is substantially parallel to a tangent to the cutter-head. In the illustrated construction the abutment 129 is integral with the plate 29, and both these parts move up when the shoe moves up. Vertically slidable in a guideway in the front of the block 37 is a carrier in the form of a slide 49 to which the slotted plate 29 is fastened in a manner presently to be described. This slide 49 is urged downwardly at all times by a compression spring 51 the lower end of which rests upon a horizontal rearward extension of the slide 49 and the upper end of which bears against the head of a screw 53, said screw passing loosely through a bore in the extension and being threaded into the block. The extent of upward and downward movement of the slide 49 is limited by nuts 55, 57 on a threaded stud 59 which, like the screw 53, extends loosely through a bore in the extension of the slide 49 and is threaded into the block. By turning the screw 53, the tension of the spring 51 may be varied; and by changing the positions of the nuts 55, 57 the limits of upward and downward movement of the slide 49 may be changed to vary the lengths of the grooves cut in the bottom of the shoe and to vary their distances from the edges of the bottom. The slotted plate 29 is firmly fastened to the slide 49 by a screw 61 the stem of which passes loosely through a bore in the upper part of the plate 29 and is threaded into the slide. Provision is made, however, for permitting the plate 29 to be swung forward so as to give access to the cutter-head whenever desired. To this end (Fig. 1) the slotted plate 29 has at its top a perforated lug through which and through spaced perforated lugs on a small plate 63 passes a pivot pin 65, said small plate being fastened to the slide 49 by screws 67. When therefore the screw 61 has been removed, the slotted plate 29 may be swung away from the cutter-head.

A preferred manner of adjusting and operating the machine is as follows: Before presenting a shoe to the machine, the screw 35 is loosened and the horizontal guide 33 is adjusted so as to move the slotted plate 29 into approximately the desired position in front of the cutter-head, after which the screw 35 is tightened again. The screw 43 is turned to bring the slotted plate into the exact desired position, and the nut 45 is adjusted to determine how far the teeth of the cutter of the cutter-head will project through the slots 31 when the plate is pushed to the left (Fig. 3). The nut 55 on the threaded stud 59 is turned to determine the initial vertical position of the plate with its abutment 129 and hence to determine how far the outer ends of the grooves in the bottom of the shoe will be spaced from the edge of the bottom; and the nut 57 is turned to determine how far the abutment and plate can be lifted, and hence the lengths of the grooves. The operator then presents the shoe to the machine with the margin of the bottom of the shoe against the slotted plate 29 and the side of the shoe against the abutment 129 and pushes the shoe first toward the cutter-head and then up. In order to aid the operator in holding the shoe firmly against the under side of the abutment 129, a thumb-rest 229 is provided which is rigid with the plate 29 and the abutment.

Inasmuch as the bottoms of lasted shoes are commonly convexly curved from side to side, an auxiliary positioning plate 69 may be provided to facilitate the proper presentation of a shoe to the machine. The upper end of the auxiliary plate is pivoted to the lower end of the slotted plate 29 about the common axes of screws 71 which are threaded through ears on the auxiliary plate 69, and the conical ends of which are received in conical sockets formed at the lower end of the plate 29. Attached to the rear face of the auxiliary plate 69 is one end of a bar 73 to the other end of which is pivoted the upper end of a treadle rod 75, the lower end of the rod being pivoted to a treadle 77. A tension spring 79 (Fig. 1) maintains the treadle rod normally in raised position. When this auxiliary plate 69 is provided, the operator depresses the treadle 77 to swing this plate into proper position to support that margin of the bottom of the shoe which is not being operated upon and then proceeds as has been described above first to push the shoe toward the cutter-head and then to raise the shoe. Owing to the length of the treadle rod and its pivotal connection the movement of the slotted plate 29 toward the cutter-head will not appreciably change the angular position of the auxiliary plate 69, and the slight angular displacement of the plate 69 due to the upward movement of the slotted plate 29 will at most have no other effect than to make the grooves slightly longer than they would be if the plate 69 were not present.

Although the invention has been set forth as embodied in a particular machine operated in a particular manner, it should be understood that the invention is not limited in the scope of its application to the particular machine or the particular manner of operation which have been shown and described.

Having thus described our invention, what we claim as new and desire to secure by Letters Patent of the United States is:

1. A machine for operating upon a lasted shoe having, in combination, a rotary cutter-head comprising spaced cutters, a yieldingly mounted plate having slots to receive the peripheries of the cutters for facilitating the presentation of a lasted shoe in position to cause the cutters to cut grooves in the overlasted margin of the upper of the shoe, and adjustable means for limiting the extent of yielding movement of the plate to predetermine the depth of the grooves.

2. A machine for operating upon a lasted shoe having, in combination, a rotary cutter-head comprising spaced cutters, a yieldingly mounted slotted plate the plane of which is substantially parallel to the axis of rotation of the cutter-head, a shoe-engaging abutment at an angle to said plate for facilitating the presentation of a lasted shoe in position to cause the cutters to cut grooves in the overlasted margin of the upper of the shoe, and adjustable means for limiting the extent of yielding movement of the plate to predetermine the depth of the grooves.

3. A machine for cutting grooves in the bottom of a lasted shoe having, in combination, a rotary cutter-head comprising spaced cutters, a plate against which the bottom of the shoe is pressed, said plate having slots in register with the cutters and being movable by pressure of the shoe against it to cause the cutters to project through the slots, and adjustable means for limiting the extent of yielding movement of the plate to predetermine the depth of the grooves.

4. A machine for cutting grooves in the bottoms of lasted shoes having, in combination, a rotary cutter-head comprising spaced cutters, and a plate against which the bottom of the shoe is pressed, said plate having slots to receive the peripheries of the cutters, the distance which the cutters project beyond the plate determining the depths of the grooves which are cut, said plate being movable with the work in a path which is substantially parallel to a tangent to the cutter-head to increase the lengths of the grooves.

5. A grooving machine comprising a rotary power-driven cutter having peripheral grooving teeth, a work rest movable toward and from the axis of said cutter and having a slot through which an operating segment of the cutter may project to engage the work, yieldable means arranged to maintain the work-engaging surface of said rest normally away from said axis, and adjustable means arranged to arrest the work rest and thereby limit the depth to which said cutter may penetrate the work.

6. A grooving machine comprising a rotary power-driven cutter having peripheral grooving teeth, a work rest having a slot through which an operating segment of said cutter may project to engage the work, means by which said work rest is movably mounted in cooperative relation to said cutter with provision for movement toward the axis of the cutter to expose said operating segment and with provision for movement of the work rest in a direction to elongate the groove generated by the cutter without affecting the depth of the groove, stops arranged to arrest said movements respectively, and springs arranged to return said work rest to an initial position away from said stops.

7. A machine for cutting grooves in a piece of work having, in combination, a rotary cutter-head comprising spaced cutters, a plate against which one face of the work is presented, said plate having slots in register with the cutters, the distance which the cutters project through the slots determining the depths of the grooves produced, and an abutment against which another face of the work is presented to facilitate proper location of the grooves in the first-named face, said abutment being movable with the work by pressure of the work against it in a path substantially parallel to a tangent to the cutter-head to increase the lengths of the grooves.

8. A machine for cutting grooves in a piece of work having, in combination, a rotary cutter-head comprising spaced cutters, a block movable in a path which is transverse to the axis of rotation of the cutter-head, a plate located in front of the cutter-head and having slots in register with the cutters, said plate being movable with the block to cause the cutters to project through the slots, a carrier movable in a path which is substantially parallel to a tangent to the cutter-head, and a work-engaging abutment supported by and movable with the carrier.

9. A machine for cutting grooves in a piece of work having, in combination, a rotary cutter-head comprising spaced cutters, a block movable in a path which is transverse to the axis of rotation of the cutter-head, a plate located in front of the cutter-head and having slots in register with the cutters, said plate being movable with the block to cause the cutters to project through the slots, a carrier movable in a path which is substantially parallel to a tangent to the cutter-head, a work-engaging abutment supported by and movable with the carrier, and means for yieldingly holding the block and the carrier normally in predetermined positions and for limiting the extents of their movements.

10. A machine for cutting grooves in a piece of work having, in combination, a rotary cutter-head comprising spaced cutters, a block movable in a path which is transverse to the axis of rotation of the cutter-head, a carrier supported by the block and movable in a path at right angles to that of the block, and a plate mounted on the carrier and having slots in register with the cutters.

11. A machine for cutting grooves in a piece of work having, in combination, a rotary cutter-head comprising spaced cutters, a block movable in a path which is transverse to the axis of rotation of the cutter-head, a carrier supported by the block and movable in a path at right angles to that of the block, a plate mounted on the carrier and having slots in register with the cutters, and means for yieldingly holding the block and the carrier normally in predetermined positions and for limiting the extents of their movements.

12. A machine for cutting grooves in a piece of work having, in combination, a rotary cutter-head comprising spaced cutters, a yieldingly mounted plate having slots in register with the cutters, an adjustable stop for limiting the extent of yielding movement of the plate, and a work-engaging abutment mounted on the plate.

13. A machine for cutting grooves in a piece of work having, in combination, a rotary cutter-head comprising spaced cutters, a plate having slots in register with the cutters, and a work-engaging abutment mounted on the plate, said plate being movable in a path toward and from the cutter-head and in a path at an angle to such movement.

14. A machine for cutting grooves in a piece of work having, in combination, a rotary cutter-head comprising spaced cutters, a block slidable in a path which is transverse to the axis of rotation of the cutter-head, a stop and a spring for respectively limiting the sliding movement of the block and for holding the block normally at one limit of its movement, a carrier slidable in the block in a path at an angle to that of the block, a second stop and a second spring for respectively limiting the sliding movement of the carrier and for holding the carrier normally at one limit of its movement, and a plate mounted on the carrier and having slots in register with the cutters.

SANTE BARONI.
PETER BARONI.